May 19, 1942.    H. ARBER    2,283,621
ENAMEL APPLICATOR
Filed April 15, 1940    2 Sheets-Sheet 2

Herman Arber    INVENTOR.
BY
H. G. Burns    ATTORNEY.

Patented May 19, 1942

2,283,621

UNITED STATES PATENT OFFICE 2,283,621

ENAMEL APPLICATOR

Herman Arber, Fort Wayne, Ind., assignor to Essex Wire Corporation, Fort Wayne, Ind., a corporation of Michigan Application April 15, 1940, Serial No. 329,653

7 Claims. (Cl. 91—46)

This invention relates to improvements in enamel applicators of that type employed for coating wire with insulating material.

It has been customary to pass a wire through an enamel bath and subsequently through a heated oven wherefore to bake the adhering enamel on the wire and thus electrically insulate it. Then, by repeatedly passing the wire through the bath and heated oven, laminations of baked enamel are formed on the wire, resulting in a more complete electrical insulation thereof.

Generally, in apparatus used in applying enamel coatings on wire, a large body of liquid enamel is maintained in a vessel in which are submerged the sheaves around which the wires to be enameled are looped. The enamel ordinarily applied to wires for insulating purposes is highly inflammable and the amount of enamel required to completely submerge the sheaves in machines of the ordinary type, because of its great bulk, creates a serious fire hazard. And, furthermore, the churning of the enamel bath by the rotating sheaves submerged therein interferes with adherence of the enamel to the wire during its passage through the bath and results in faulty insulation.

An object of the present invention is to provide a wire enameling apparatus requiring but a small transient quantity of enamel, thus to reduce fire hazard.

Another object of the invention is to provide a wire enameling apparatus so constructed that the wire-carrying sheaves are disposed externally with respect to the enamel bath and oven whereby the sheaves are readily accessible for stringing the wire in the apparatus, and clear observation of the operation of the machine is afforded.

And a further object of the invention is to preserve in good condition the enamel as it is applied to the wire in the machine.

Other objects and advantages of the invention appear in the following description.

An illustrative embodiment of the invention is shown in the accompanying drawings, in which—

Fig. 3 is an end elevation projected from Fig. 2, a portion thereof being broken away.

Figure 1:
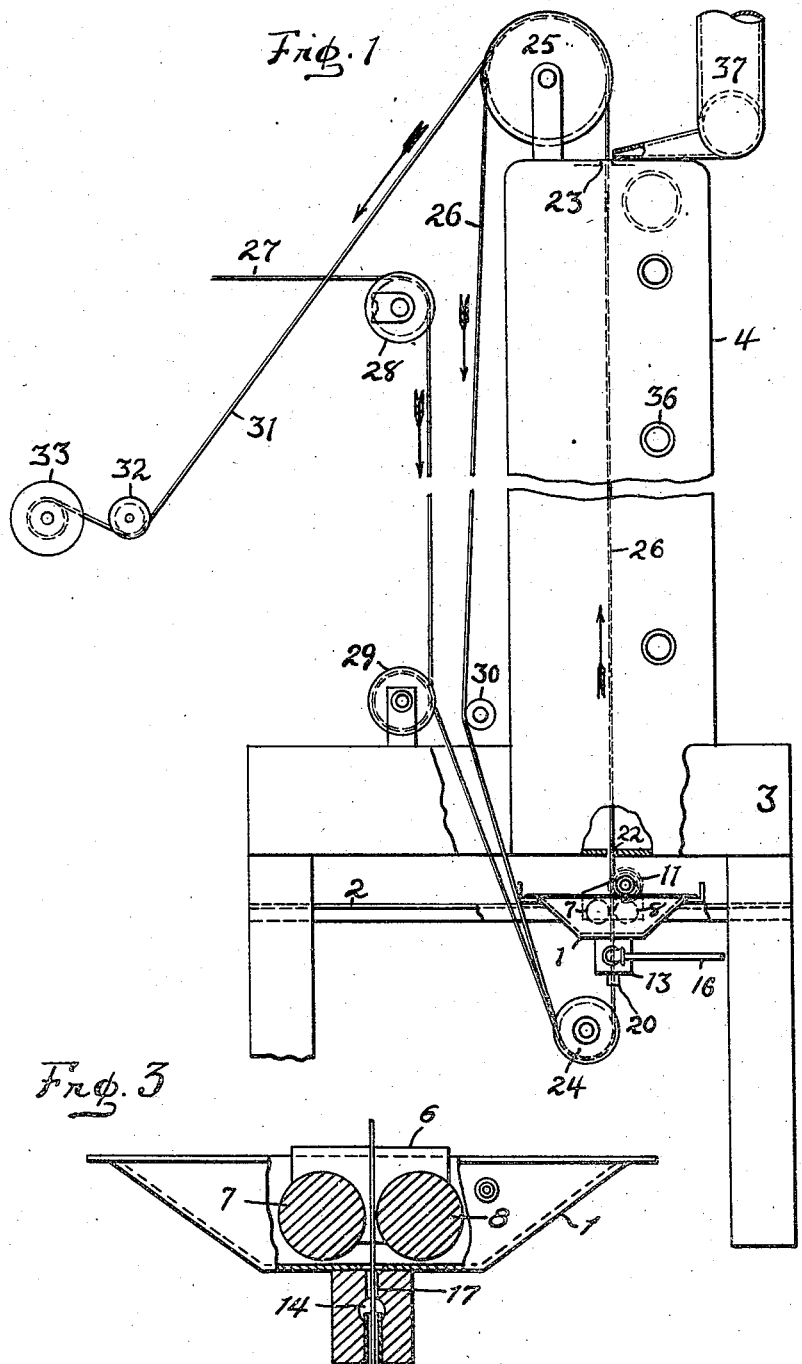
Fig. 1 is a diagram showing an end elevation of a wire enameling apparatus in which the invention is embodied.
Figure 2:
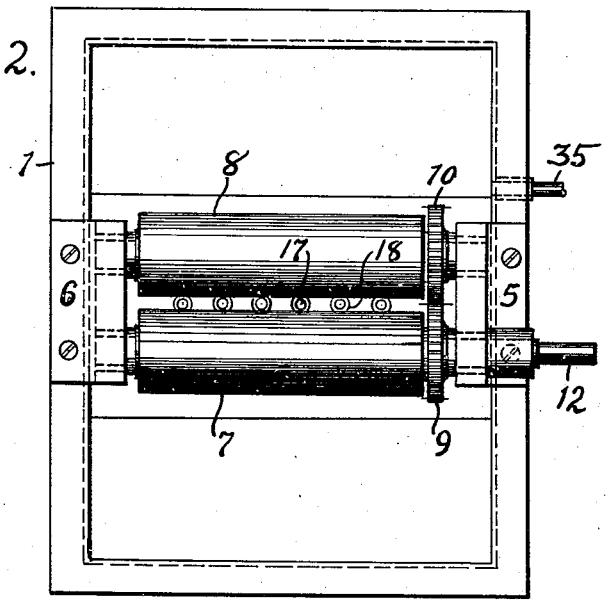
Fig. 2 is a top plan view of the enamel pan the applicator rollers and the mechanism for rotating the rollers.
Figure 4:
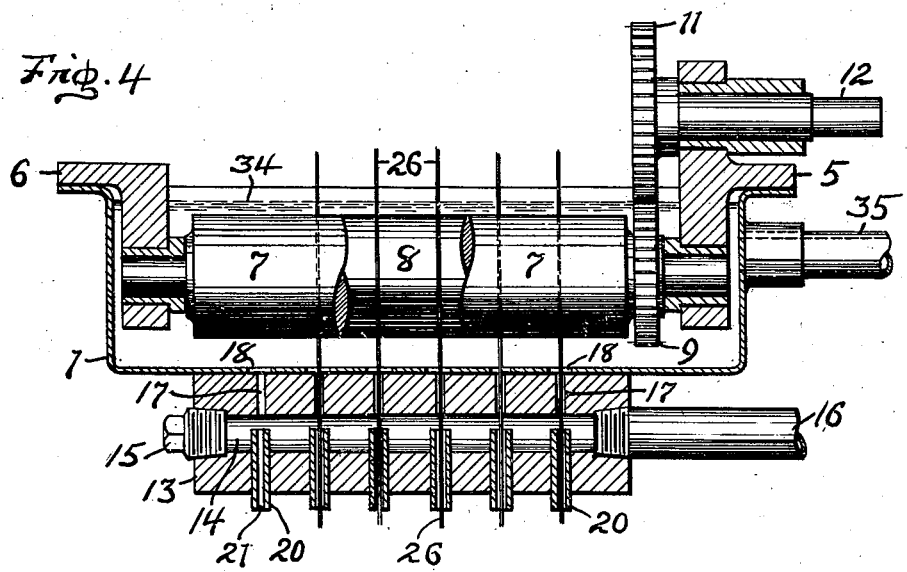
Fig. 4 is a front elevational view, upon an increased scale of the enamel applicator apparatus, partially broken away and in section.

The illustrative embodiment of the invention consists of an enamel pan 1 that is secured on supports 2 in a bench 3 upon which is mounted an oven 4 such as is ordinarily used in baking enamel onto wire passing therethrough.

The pan 1 has in connection therewith brackets 5 and 6 secured to its ends that depend into the pan and have two parallel rollers 7 and 8 spaced apart and rotatably mounted therein, the axes of said rollers being disposed in a horizontal plane beneath the top of the pan. The rollers have gears 9 and 10 respectively that mesh with each other and one of said rollers meshes with a driving gear 11 that is actuated by a drive-shaft 12, thus when the drive-shaft is actuated the rollers 7 and 8 are rotated accordingly.

Secured to the bottom of the pan 1 is a manifold block 13 that extends parallel with the rollers and has therein a chamber 14 that is closed at one end by a plug 15 and connected at its other end with a pipe 16 through which the chamber is supplied with air under pressure from any suitable source. The block has a series of apertures 17, spaced apart from each other, which extend vertically from the chamber 14 and afford communication between the chamber and the pan which has corresponding openings 18 in its bottom. The block also has in its bottom a series of tubes 20 alined respectively with the apertures 17. Preferably the bores 21 through the tubes are of less diameter than the bores of the apertures 17, are alined therewith and are axially disposed in a vertical plane that extends midway between and parallel with said rollers. The bores in the tubes are made small as is consistent with free travel of the wire therethrough to induce entrainment of air with the wire, and also to restrain escape of air from the air chamber back through the tubes. The passageways are made comparatively larger than the bore of the tubes so that entrainment of air with the wire up into the overlying enamel bath is substantially negligible.

The oven has in its lower end a wire-receiving opening 22 extending above the apertures 17, and the upper end of the oven has a wire outlet opening 23 alined with the bottom opening and the apertures 17 in the block.

Beneath the pan 1 is supported a series of sheaves 24, and above the top of the oven is supported a corresponding series of sheaves 25, said sheaves being so positioned that a wire 26 when looped and drawn around the sheaves, one part of each loop will travel from the lower to the upper sheaves and pass freely through the bores of the tubes 20, apertures 17, wire-receiving opening 22, and through the oven, out through the wire outlet opening 23 and over the corresponding upper sheaves 25. The feed end 27 of the wire is drawn over a guide pulley 28, passes around a driven capstan 29 by which the wire is fed onto an endmost of the lower sheaves 24 from which the wire travels in a direct line over a corresponding upper sheave 25, and from thence around a guide roller 30 onto the next of the lower sheaves 24. The travel of the wire continues around from sheave to sheave, its pay-out end portion 31 being drawn around a guide roller 32 and finally wound upon a spool 33 in readiness for disposal.

The pan 1 is supplied with liquid enamel 34 through a supply pipe 35 to a level sufficiently high as to submerge the rollers 7 and 8. Preferably the oven is heated by combustion of gas supplied through openings 36, and the fumes from the oven are drawn off from the outlet opening 23 through any suitable draft device 37 to the atmosphere as in the usual practice.

Operation

In operation, the gear shaft 12, capstan 29 and spool 33 are rotated by means of any suitable source of power (not shown) so that the rollers 7 and 8 are continuously revolved on their axes over toward each other, and the wire is caused to pass repeatedly upward through the air chamber into the enamel bath between the rollers and through the oven during which the enamel adhering to the wire is baked in place, thus completely insulating the wire.

Sufficient air pressure is maintained in the chamber 14 by air derived through the supply pipe 16 to prevent escape of enamel from the pan by seepage out through the apertures 17 and the tubes 20. In traveling up through the tubes 20 and the apertures 17 more or less atmosphere becomes entrained with the wire and is drawn into the chamber 14 creating air pressure therein, and seepage of the enamel from the pan through the apertures into the chamber is forestalled by the air pressure therein while the wire passes up through said apertures into the enamel bath. It is desirable, when for any cause movement of the wire ceases, to supply air through the pipe 16 in sufficient quantity to overcome depletion of the pressure in the chamber 14 by escape of air out through the tubes, and thus prevent seepage of enamel from the pan through the apertures.

By this arrangement the bores of the tubes and apertures may be made sufficiently large as to accommodate free passage of the wire therethrough, when the machine is in operation, without actually contacting the walls of the bores and becoming scuffed. Also, the rollers 7 and 8 are spaced sufficiently apart from each other as to permit the wire to pass therebetween without having actual contact therewith. The enamel in the pan, due to the rotation of the rollers over toward each other, is piled continuously up onto and downwardly in opposition to the movement of the traveling wire to which it adheres and forms a film thereon which is subsequently baked by the heat in the oven. By this arrangement the enamel and the wire have movement in relative opposite directions and the intimacy of contact therebetween is materially accentuated and evenness of the coating on the wire is assured.

A feature of the invention is that both the lower and upper sheaves are located exteriorly where they are freely accessible which greatly facilitates initial threading of the wire in the machine and circumvents the detrimental surging and foaming of the enamel bath that is occasioned by sheaves when submerged in the enamel bath as ordinarily practiced.

Variations from the particular construction above disclosed may readily be made by exercise of engineering skill without departure from the spirit or scope of the invention, and the following claims are intended to be inclusive of such variations.

What I claim is:

1. An enamel applicator for wire constituted of a pan containing a bath of enamel, parallel rollers spaced apart from each other submerged in said bath provided with mechanism for rotating same over toward each other to cause the enamel to pile and flow downwardly between said rollers, a chambered member on the bottom of the pan having restricted passageways communicating with the atmosphere, the chamber in said member, and the pan through the bottom thereof, and alined with the space between said rollers, to permit free upward travel of a wire through the passageways and said bath, and means for maintaining air pressure in said chamber.

2. An enamel applicator for wire constituted of an enamel-containing pan having on its bottom a chambered member provided with axially alined bores communicating respectively between the atmosphere and the chamber and between the chamber and the pan to permit upward travel of a wire therethrough into the enamel in said pan, and means for maintaining air pressure in the chamber of said member.

3. An applicator for wire having a pan containing a liquid bath, means forming an air chamber on the bottom of said pan provided with axially alined wire inlet openings and passageways that have communication respectively through said chamber with the atmosphere and said pan, said inlet opening being so restricted as to cause entrainment of air with said wire and consequent rise of pressure within said chamber to prevent seepage of enamel from the pan back through said passageways, and horizontal rollers disposed in said bath provided with means to axially rotate said rollers over toward each other to pile the bath against said wire.

4. An applicator for wire having a pan containing a liquid bath, and means forming an air chamber on the bottom of said pan provided with axially alined wire inlet openings and passageways that have communication respectively through said chamber with the atmosphere and said pan, said inlet openings being so restricted as to cause entrainment of air with, said wire and consequent rise of air pressure in said chamber to prevent seepage of enamel from the pan back through said passageways, the passageways being sufficiently large as to obviate entrainment of air with the wire traveling therethrough into said bath.

5. An apparatus for coating wire with enamel, a stationary enamel-containing pan provided with wire openings in its bottom, horizontally disposed parallel rollers in said pan spaced apart and provided with means to axially rotate same over toward each other to cause flow of the enamel in the pan downwardly between said rollers, a block secured to the bottom of said pan having an air chamber and apertures communicating with said pan, tubes communicating with said chamber through the bottom of said block alined with said apertures and with the space between said rollers so that a wire when drawn through said tubes into said pan passes between said rollers without contact therewith, and means for maintaining air pressure within said chamber to prevent seepage of enamel from the pan through said passageways.

6. An applicator for coating wire with liquid enamel, said aplicator having a pan containing an enamel bath, horizontal rollers spaced apart and submerged in said bath provided with means for axially rotating said rollers over toward each other to pile said enamel and cause downward flow thereof between the rollers, a chambered member on the bottom of the pan having axially alined bores the uppermost of which have communication with said pan, through the bottom thereof, and the lowermost of which are open to the atmosphere, so that a wire when drawn through said bores into the pan is coated with the piled enamel between said rollers, and means to maintain sufficient air pressure in the chamber of said member to prevent seepage of the enamel from the chamber through said bores.

7. An applicator for coating wire with liquid enamel preparatory to treatment thereof in an oven, said applicator having a pan containing an enamel bath, horizontal rollers spaced apart and submerged in said bath provided with means for axially rotating said rollers over toward each other to pile said enamel and cause downward flow thereof between the rollers, a block on the bottom of the pan having an air chamber therein and a series of apertures affording communication between the chamber and the pan and wire receiving openings in its bottom axially alined with said apertures, the bore of said openings being more restricted in diameter than said passageways so that a wire when caused to travel through the openings and passageways and up through the enamel, air entrained with the wire enters the chamber causing pressure therein that prevents seepage of enamel from the chamber back through said passageways.

HERMAN ARBER.